US008706734B2

(12) United States Patent
Duman et al.

(10) Patent No.: US 8,706,734 B2
(45) Date of Patent: Apr. 22, 2014

(54) ELECTRONIC RESOURCE ANNOTATION

(75) Inventors: Hakan Duman, Ipswich (GB);
Alexander L Healing, Ipswich (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 12/918,489

(22) PCT Filed: Mar. 31, 2009

(86) PCT No.: PCT/GB2009/000841
§ 371 (c)(1),
(2), (4) Date: Aug. 20, 2010

(87) PCT Pub. No.: WO2009/122158
PCT Pub. Date: Oct. 8, 2009

(65) Prior Publication Data
US 2010/0332478 A1 Dec. 30, 2010

(30) Foreign Application Priority Data

Mar. 31, 2008 (EP) .................................. 08251261

(51) Int. Cl.
*G06F 7/00* (2006.01)
*G06F 17/30* (2006.01)

(52) U.S. Cl.
USPC ...................................................... 707/738

(58) Field of Classification Search
USPC ......................................... 707/738, 999.002
See application file for complete search history.

(56) References Cited

U.S. PATENT DOCUMENTS

| 5,943,670 | A  | * | 8/1999  | Prager ................................... 1/1 |
| 7,685,198 | B2 |   | 3/2010  | Xu et al. |
| 7,685,200 | B2 |   | 3/2010  | Gunawardena et al. |
| 7,870,135 | B1 | * | 1/2011  | Cheung ......................... 707/737 |
| 7,953,775 | B2 |   | 5/2011  | Dasdan |
| 2006/0184566 | A1 |   | 8/2006  | Lo et al. |
| 2007/0174247 | A1 | * | 7/2007  | Xu et al. ............................. 707/3 |
| 2007/0226077 | A1 | * | 9/2007  | Frank et al. ...................... 705/27 |
| 2008/0040674 | A1 |   | 2/2008  | Gupta |
| 2008/0195657 | A1 | * | 8/2008  | Naaman et al. ............ 707/104.1 |
| 2008/0235216 | A1 | * | 9/2008  | Ruttenberg ........................ 707/5 |
| 2008/0270538 | A1 | * | 10/2008 | Garg et al. ..................... 709/204 |

FOREIGN PATENT DOCUMENTS

WO 2009/030902 3/2009

OTHER PUBLICATIONS

Yusef Hassan-Montero and Victor Herrero-Solana, "Improving Tag-Clouds as Visual Information Retrieval Interfaces", Mérida, INSCIT2006; Oct. 25-28, 2006, 6 pgs.

(Continued)

*Primary Examiner* — Alexey Shmatov
(74) *Attorney, Agent, or Firm* — Nixon & Vanderhye PC

(57) ABSTRACT

A distributed system is described in which resource utilisation decisions depend upon the categorisation of resource descriptions stored in the distributed system. In the principal embodiment, the resource descriptions are web service descriptions which are augmented with tags (i.e. descriptive words or phrases) entered by users and/or by web service administrators. A service taxonomy is constructed on the basis of the tags, and is subsequently used in suggesting tags to the user which the user might want to ascribe to the service in question. This leads to a more coherent and focused set of tags in the system, which in turns results in better resource utilisation decisions and hence a more efficient use of the resources of the distributed system.

14 Claims, 14 Drawing Sheets

(56) References Cited

OTHER PUBLICATIONS

Hayman, S., & Lothian, N. (2007). Taxonomy Directed Folksonomies: Integrating user tagging and controlled vocabularies for Australian education networks. World Library and Information Congress: 73rd IFLA General Conference and Council, Aug. 19-23, 2007, Durban, South Africa—available at http://archive.ifla.org/IV/ifla73/papers/157-Hayman_Lothian-en.pdf, 27 pgs.

Niwa S et al: "Web page recommender system based on folksonomy mining for ITNG '06 submissions" Proceedings. Third International Conference on Information Technology: New Generation IEEE Computer Society Los Alamitos, CA, USA, 2006, p. 6 pgs.

Xu Z et al: "Towards the Semantic Web: Collaborative Tag Suggestions" Proceedings of 15th International World Wide Web Conference WWW2006 Proceedings of the Collaborative Web Tagging Workshop, [Online] May 23, 2006, XP002486198 Edinburgh, Scotland, UK, 8 pgs.

F. Calefato, D. Gendarmi, F. Lanubile: "Towards Social Semantic Suggestive Tagging" 2007, 4th Italian Semantic Web Workshop Semantic Web Applications and Perspectives (SWAP 2007), 9 pgs.

Shilad Sen, Shyong K. Lam, Al Mamunur Rashid, Dan Cosley, Dan Frankowski, Jeremy Osterhouse, F. Maxwell Harper, John Riedl: "Tagging, communities, vocabulary, evolution" Nov. 2006, ACM, Conference on Computer Supported Cooperative Work (CSCW), Banff, Alberta, Canada, 11 pgs.

Milan Vojnovic, James Cruise, Dinan Gunawardena, Peter Marbach: "Ranking and Suggesting Tags in Collaborative Tagging Applications" Feb. 2007, Microsoft Corporation, Technical Report MSR-TR-2007-06, Microsoft Research, 17 pgs.

Nikhil Garg, Ingmar Weber: "Personalized tag suggestion for flickr" Apr. 21, 2008, ACM, Proceeding of the 17th International Conference on World Wide Web, Beijing, China, 2 pgs.

You Are What You Tag by: Yi-Ching Huang, Chia-Chuan Hung, Jane Y. Hsu in Proceedings of AAAI 2008 Spring Symposium Series on Social Information Processing (2008)—see http://www.aaai.org/Papers/Symposia/Spring/2008/SS-08-06/SS08-06-008.pdf, 6 pgs.

International Search Report for PCT/GB2009/000845 mailed May 8, 2009.

International Search Report for PCT/GB2009/000841 mailed May 27, 2009.

Office Action dated Apr. 25, 2012 issued in co-pending U.S. Appl. No. 12/919,571.

Wen-Tai Hsieh et al., "A collaborative tagging system for learning resources sharing", Current Developments in Technology-Assisted Education (2006), XP-002486118, 6 pgs.

Begelman et al., "Automated Tag Clustering: Improving search and exploration in the tag space", WWW 2006, May 22-26, 2006, Edinburgh, U.K., XP-002486127, 6 pgs.

Ae-Ttie Ji et al., "Collaborative Tagging in Recommender Systems", Intelligent E-Commerce Systems Laboratory, Inha University, Korea, AI 2007, LNAI 4830, pp. 377-386, 2007, 10 pgs.

Brooks et al. "Improved Annotation of the Blogosphere via Autotagging and Hierarchical Clustering", Computer Science Department, University of San Francisco, CA, WWW 2006, May 23-26, 2006, Edinburgh, Scotland, XP-002486141, 7 pgs.

Specia et al., "Integrating Folksonomies with the Semantic Web", Knowledge Media Institute—The Open University, Milton Keynes, U.K., ESWC 2007, LNCS 4519, pp. 624-639, 2007, XP-002486196, 32 pgs.

Meyer et al., "Light-Weight Semantic Service Annotations Through Tagging", Hasso-Plattner Institute for IT-Systems-Engineering at the University of Potsdam, Potsdam, Germany, ICSOC 2006, LNCS 4294, pp. 465-470, 2006, XP-002486152, 6 pgs,.

Kaser et al., "Tag-Cloud Drawing: Algorithms for Cloud Visualization", WWW 2007, May 8-12, 2007, Banff, Canada, XP-002486153, 10 pgs.

Office Action (14 pgs.) dated Dec. 1, 2011 issued in co-pending U.S. Appl. No. 12/675,585.

Office Action (14 pgs.) dated Apr. 25, 2012 issued in co-pending U.S. Appl. No. 12/919,571.

International Search Report for PCT/GB2009/000841, mailed May 27, 2009.

Bruno et al., "An Approach to Support Web Service Classification and Annotation", RCOST—Research Centre on Software Technology, University of Sannio, Department of Engineering, Benevento, Italy, XP-002486150, Eee '05, The 2005 IEEE International Conference on Source (6 pgs.).

* cited by examiner

| Service ID | User-Assigned Tags | Categories |
|---|---|---|
| H1 | \<helicopter\>, \<fast\>, \<thermal\>, \<camera\> \<nightvision\> | Comms.Camera.Mobile |

Figure 2A

| Service ID | User-Assigned Tags | Categories |
|---|---|---|
| H2 | \<helicopter\>, \<location\>, \<mapping\>, \<display\> \<passenger\> | Location |

Figure 2B

| Service ID | User-Assigned Tags | Categories |
|---|---|---|
| C1 | \<road\>, \<driver\>, \<car\> \<remember\> \<text\> | Comms.Display.Text |

Figure 2C

| Service ID | User-Assigned Tags | Categories |
|---|---|---|
| C2 | \<road\>, \<driver\>, \<car\> \<touchscreen\>, \<remember\> \<interactive\>, \<location\>, \<mapping\> \<picture\> | Comms.Display.Graphics |

Figure 2D

| Service ID | User-Assigned Tags | Categories |
|---|---|---|
| C3 | \<voice\> \<radio\> | Comms.Voice |

Figure 2E

| Service ID | User-Assigned Tags | Categories |
|---|---|---|
| P1 | <beat>, <voice> <acknowledged> <noisy> | Comms.Voice |

Figure 2F

| Service ID | User-Assigned Tags | Categories |
|---|---|---|
| S1 | <road> , <drivers>, <sign>, <text> | Comms.Display.Text |

Figure 2G

| Service ID | User-Assigned Tags | Categories |
|---|---|---|
| S2 | <road> , <drivers>, <sign>, <graphics> | Comms.Display.Graphics |

Figure 2H

| Service ID | User-Assigned Tags | Categories |
|---|---|---|
| C4 | <gps>, <driver> <direction> <route> | Location |

Figure 2I

| Service ID | User-Assigned Tags | Categories |
|---|---|---|
| F1 | <yobs> <fridaynight> <towncentre> <view> <street> <remotecontrolled> <camera> | Comms.Camera.Fixed |

Figure 2J

| Categories | User-Assigned Tags |
|---|---|
| Comms.Camera.Fixed | <yobs> <fridaynight> <towncentre> <view> <street> <remotecontrolled> <camera> |

Figure 3B-1

| Categories | User-Assigned Tags |
|---|---|
| Comms.Camera.Mobile | <helicopter>, <fast>, <thermal>, <camera> <nightvision> |

Figure 3B-2

| Categories | User-Assigned Tags |
|---|---|
| Comms.Voice | <voice> <radio> <beat> <acknowledged> <noisy> |

Figure 3B-3

| Categories | User-Assigned Tags |
|---|---|
| Comms.Display.Text | <road>, <driver>, <car> <remember> <drivers>, <sign>, <text> |

Figure 3B-4

| Categories | User-Assigned Tags |
|---|---|
| Comms.Display.Graphics | \<road\>, \<driver\>, \<car\> \<touchscreen\>, \<remember\> \<interactive\>, \<location\>, \<mapping\> \<picture\> \<drivers\>, \<sign\>, \<graphics\> |

Figure 3B-5

| Categories | User-Assigned Tags |
|---|---|
| Location | \<gps\>, \<driver\> \<direction\> \<route\> \<helicopter\>, \<location\>, \<mapping\>, \<display\> \<passenger\> |

Figure 3B-6

ELECTRONIC RESOURCE ANNOTATION

This application is the U.S. national phase of International Application No. PCT/GB2009/000841 filed 31 Mar. 2009 which designated the U.S. and claims priority to EP Patent Application No. 08251261.7 filed 31 Mar. 2008, the entire contents of each of which are hereby incorporated by reference.

BACKGROUND AND SUMMARY

The present invention relates to electronic resource annotation. It has particularly utility when applied in electronic information retrieval, whether that information be in the form of documents or photos, or a description of a software component in a distributed system.

The dominant electronic information retrieval system in the world today is the World Wide Web. The largely unstructured nature of the Web means that the primary method of identifying a web-page containing the information which a user requires is to use a search engine. Search engines normally generate full-text indices which can be used to quickly identify web pages which contain all the words included in the user's search query. Page-ranking algorithms are then used to present the most relevant of those web-pages to the user.

Whilst this represents an effective method of retrieving electronic information relevant to a query, the only stage at which human intelligence is exploited is in the page-ranking algorithm (which captures human's recognition of the worth of a site by counting the number of web-pages which link to the site in question). The creation of the full-text index is purely automatic.

It is hoped that 'tagging' systems will improve search results by allowing users to decide which labels or keywords should be attributed to a resource.

When a user finds a web-page which contains useful information he can save the address (URL) of the webpage on the computer which he is using to browse the Web. This is the familiar 'bookmarking' process. The 'bookmarking' interface enables a user to store bookmarks in a hierarchical folder system. Hence, the user is able to navigate to a useful page by drilling down to a relevant folder in the hierarchical folder system.

So-called social bookmarking is a development of this idea in which a user can upload the bookmarks stored on their own computer to a server computer. That server computer then offers the bookmark information to others.

Some such sites offer users the ability to add annotations (tags) to the shared bookmarks. These annotations might be user ratings for the web-page or keywords which the user has assigned to the web-page (the latter often being referred to as 'tags'). An example of such a site is the website del.icio.us. The web-site del.icio.us allows users to see a list of sites tagged with a given word by users. It is trivial to rank them by the number of users which have given a web-page the same tag. This gives some idea of user's perception of the quality of the webpage and also its relevance to that tag.

Unlike top-down centralized approaches, collaborative tagging systems (sometimes referred to as folksonomies) like del.icio.us provide users with the freedom to use tags of their choice and thus capture the way in a community of users describe and categorise resources. The community of users is thus provided with a set of resources which are tagged in a way which allows them to quickly retrieve relevant resources.

Where a community of users includes users who describe and categorise resources in different ways, the above benefits are diluted. To overcome this, some systems suggest tags to the user which better fit with the way other members of the community of users have chosen to tag the resource.

A straightforward way of doing this is to present the user with tags which have proved popular amongst the community of users. A common way of providing a user with a visualisation of this is using tag clouds, visual representations where each tag is displayed with a font size which is proportional to its popularity. Second generation tag clouds Integrate the notion of relationships among tags or their meaning as seen in the paper entitled "Improving Tag-Clouds as Visual Information Retrieval Interfaces" presented by Y. Hassan-Montero and V Herrero-Solana at the International Conference on Multidisciplinary Information Sciences and Technologies, in October 2006.

In del.icio.us, when a user visits the page containing all the bookmarks tagged with a given tag, a list of related tags to that selected one is shown inside a sidebar. The related tags might be those which are found to frequently be applied together with the given tag.

Another method of choosing tags to suggest to the user is to use thesauri like WordNet, Google Search and other engineered existing ontologies such as Dublin Core or Library of Congress Authorities. An example is seen in S. Hayman and N. Lothian, "Taxonomy-directed Folksonomies", World Library and Information Congress: $73^{rd}$ IFLA General Conference and Council, Durban, July 2007 where, as a user types a tag, a list of auto-complete suggestions are given, and when a user moves the cursor over one of those suggestions, narrower terms and broader terms are also offered. Such narrower terms and broader terms might well be based on an existing taxonomy.

Yet another method of choosing tags to suggest to the user is to calculate clusters of tags on the basis of the degree to which those tags tend to be used together by users (referred to in the art as the co-occurrence of tags), and then propose to the user tags which are in the same cluster as the tag the user has entered. An example of this is seen in the paper "Automated Tag Clustering: Improving Search and Exploration in the Tag Space", by Begelmann et al, found in the proceedings of the $15^{th}$ International World Wide Web Conference WWW2006.

The paper "Integrating Folksonomies with the Semantic Web", by Lucia Specia et al (at pages 624-632 of the proceedings of the $4^{th}$ European Semantic Web Conference 2007) goes further, and associates clusters of tags with concepts in ontologies, and thereby finds relationships between clusters of tags. The resulting structure can be used in query extension/disambiguation, visualization, and tag suggestion.

The paper "A Collaborative-Tagging System for Learning Resources Sharing", by Wen-Tai Hsieh et al, at pages 1364-1368 of Current Developments in Technology-Assisted Education, vol. 2, also proposes that a concept hierarchy of tags should be constructed and used in refining searches and/or suggesting tags.

Each of the above three papers group tags to form a taxonomy of tags.

The paper "An Approach to Support Web Service Classification and Annotation", by Marcello Bruno et al, proposes automatically classifying web services to specific domains based on annotations applied to those web services by their authors and building a lattice of relationships between service annotations. The automatic classification is for use in discovering web-services for use in building software applications from web-service components.

The paper "Improved Annotation of the Blogosphere via Autotagging and Hierarchical Clustering", proposes the automatic generation of a 'hierarchy of tags' which, despite its name, has a global cluster that contain all of the articles used in generating the hierarchy, which global cluster is then subdivided into sub-clusters containing subsets of all the articles. The automatically generated 'hierarchy of tags' can then be used to suggest synonymous tags, as well as more specific and more general tags.

The present inventors have realised that the classification of resources (documents, services etc.) into a taxonomy or other classification scheme can be further improved.

According to a first aspect of the present invention, there is provided a method of electronic resource annotation comprising:

receiving, for each of a plurality of categories of resource, a category tag list of tags often applied to resources in that category;

receiving, from a user who has reviewed the resource, one or more tags the user attributes to that resource;

calculating on the basis of said one or more tags received from said user and said category tag lists, a degree of membership of the resource to each of said plurality of categories;

selecting two or more candidate categories to which the resource has the highest degree of membership; and proposing further tags in the category tag lists of said selected candidate categories to said user.

By allowing a user to apply one or more tags to a resource and then using category tag lists built from tags applied by users to resources to calculate a degree of membership of the resource to each of a plurality of candidate categories to which the resource might belong, selecting the two or more candidate categories to which the resource has the highest degree of membership, and then proposing tags from the category tag lists of the selected two or more candidate categories, a method of encouraging a user to use tags which reduce ambiguity as to which category a resource belongs is provided. This speeds up information retrieval and makes it more accurate.

Preferably, said method further comprises recognising user selection of said one or more proposed further tags, and repeating said selection and proposal steps.

In this way the list of suggested tags can be updated each time the user enters another tag to be applied to the resource.

Preferably, some of said proposed tags are appropriate to one candidate category and one or more other proposed tags are appropriate to another category.

This allows a user to resolve an ambiguity as to which of two categories a resource belongs by choosing a tag appropriate to one of the two or more candidate categories. For example, if a user enters the tag 'jaguar', and the system finds that 'jaguar' might belong to category animal/cat or product/car, then the system might propose 'car' and 'cat' as suggested tags. It will be soon how, by selecting one or the other of those tags, then the user enters tags which better characterise the resource. Furthermore, when combined with the updating of the suggested tags in response to each of the users tag selections, it will be seen how the user will be encouraged to enter tags which resolve successive ambiguities and thus provide a useful set of tags for characterising the resource.

Preferably, proposing further tags involves emphasizing tags associated with candidate categories judged to be more probable candidate categories given one or more tags provided by the user.

This differs from the way in which tag clouds emphasize more common tags used by users to tag resources in general. Instead, in this case, tags which help determine which candidate category the resource should be placed into, are emphasized, i.e. while selecting the appropriate tags for a resource the user can see which category it will most probably be assigned to. If the user wants the resource to be placed into another category he/she can choose to select different tags which are more associated with the category in question.

This has the advantage of giving the user feedback which seeks confirmation that the candidate category considered most likely by the system is in fact an appropriate category for the resource.

In preferred embodiments, said emphasis is achieved by presenting the user with more tags associated with said selected candidate categories than tags associated with other (unselected) categories. Emphasis could also be created by displaying tags associated with the more likely categories in a bigger font, or in a different colour or, more generally, controlling the displaying to provide some form of visual emphasis to tags associated with the selected candidate categories.

According to a second aspect of the invention, there is provided a distributed system comprising one or more user terminals, an electronic resource store, a resource label store for storing, for each of said electronic resources, labels applied by users to said electronic resource, and communications links between said user terminal and said electronic resource data store and between said user terminal and said resource labelling store;

said distributed system further comprising a resource categorisation store which stores, for each resource, an indication of a category to which said resource is deemed to belong;

wherein each of said user terminals is arranged in operation to:

enable said user to select an electronic resource;

in response to said selection, to display said selected electronic resource on a display of the user terminal;

to receive via a user interface provided by the user terminal, textual labels which the user considers appropriate to said selected electronic resource; and to send said textual labels together with an indication of said resource to said resource label store to enable said store to be updated;

said distributed system being arranged in operation to respond to a user selection of an electronic resource by identifying one or more candidate categories for said resource using the information stored in said resource categorisation store, and to select labels appropriate to said one or more candidate categories and to send said labels to said user terminal;

said user terminal being further arranged in operation to present said user with said labels as proposals for labels to be applied to the selected resource.

BRIEF DESCRIPTION OF THE DRAWINGS

There now follows a description, given by way of example only, of specific embodiments of the present invention, which refers to the accompanying drawings in which:

FIGS. 2A to 2J show service records stored in respective service hosts of the infrastructure;

FIGS. 3B-1 to 3B-6 show category tag lists included within the service taxonomy;

FIG. 4 is a flow-chart illustrating the how a service host registered with the service-based infrastructure;

FIG. 5 is a flow-chart illustrating the operation of a service browser for discovering services and presenting the output of those services;

FIG. 6 is a flow-chart showing the operation of the service tagging interface offered by the service browser in more detail;

DETAILED DESCRIPTION OF PRESENT EXAMPLE EMBODIMENTS

Figure 1:
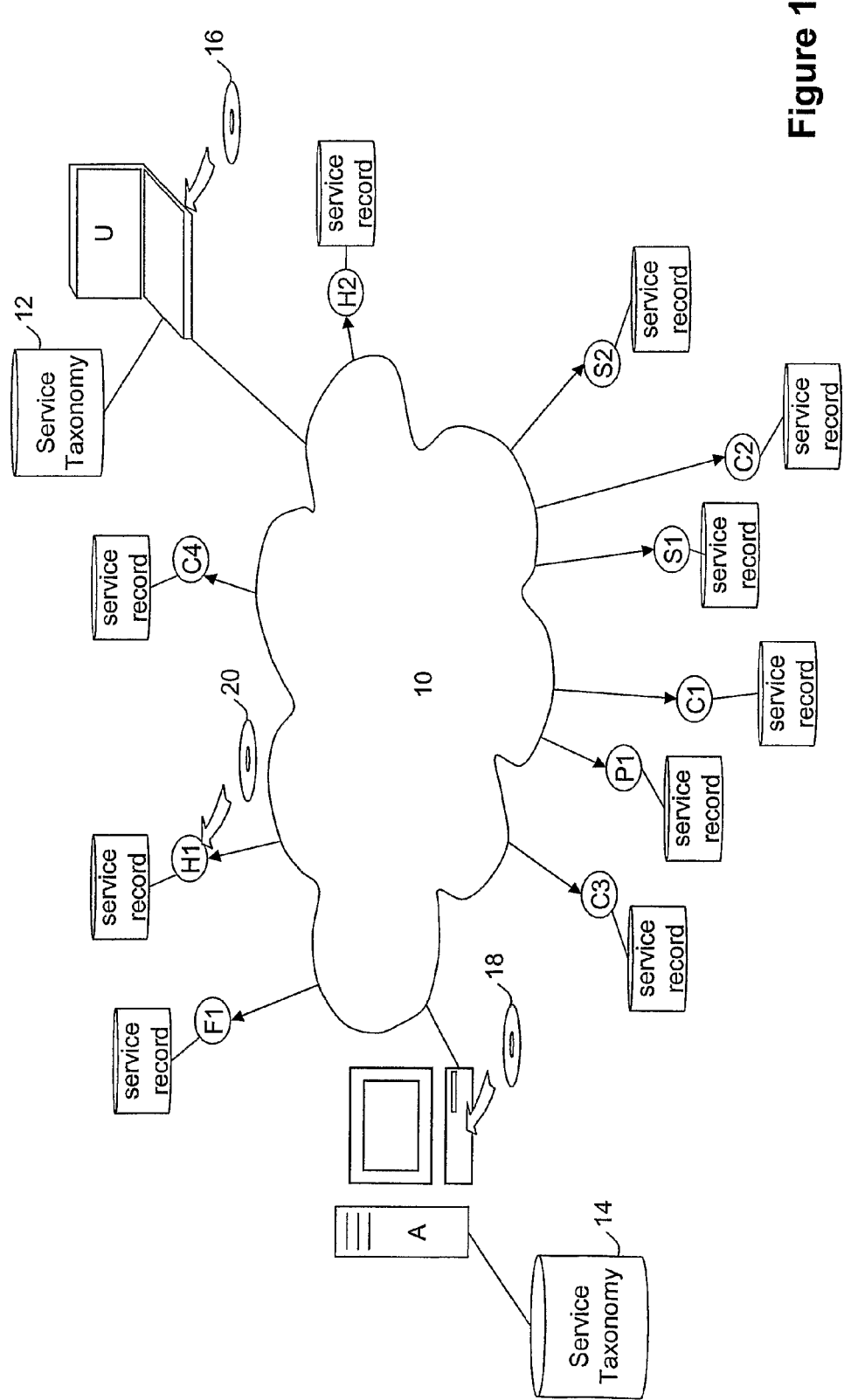
FIG. 1 shows networked service-based infrastructure used in supporting a metropolitan police force.

FIG. 1 shows a plurality of electronic devices including displays, cameras and location-reporting systems (C1, C2, C3, C4, H1, H2, S1, S2, F1, P1). Each of these devices is able to run application programs, and components of applications distributed across the infrastructure, since it includes an embedded system which runs a suitable operating system such as Windows CE. Each device has inbound and outbound communications links with communications network 10, and has a persistent memory in which updateable service records are stored. The electronic devices provide services in response to commands issued by a user of laptop computer U connected to the network 10. The laptop computer U includes persistent storage 12 such as a hard disk. Also connected to the network 10 is an administration computer A which has persistent storage 14. Although only one user computer is illustrated, in practice a plurality (tens or even hundreds) of such user computers might be connected to the network 10.

Each of the programmable devices/computers stores and executes middleware which enables the devices/computers to overlay an application-level network on the network, to provide services to other devices/computers on the network and to find and execute services on other devices/computers in the network. An example of suitable middleware is NEXUS middleware as described in the paper 'NEXUS—resilient intelligent middleware' by Nima Kaveh and Robert Ghanea-Hercock published in BT Technology Journal, vol. 22 no. 3, July 2004 pp 209-215—the entire contents of which are hereby incorporated by reference. FIG. 1 shows the middleware from CD-ROM 20 being installed on electronic device H1—it is to be understood that the middleware will be installed on each of the other electronic devices too. The middleware might instead be introduced as firmware in the electronic device, or be downloaded from a program server (not shown) connected to the network 10.

Alternatively, commercially available middleware such as IBM's WebSphere or BEA's WebLogic could be used.

A service browser application is loaded from CD 16 onto laptop U which in addition to providing a user interface enabling the user to request services from the programmable devices, also provides the user with an interface allowing the user to augment the service records by adding one or more tags to those service records. Correspondingly, each of the programmable devices is provided with software which responds to service requests and allows the service record stored in the device's persistent memory to be updated.

Management software is loaded from CD 18 onto administration computer A which enables the administrator to download service records from the various electronic devices, process those service records, and then upload amended service records to the various devices. The processing of service records include the semi-automatic categorization of those service records as will be described in detail below.

FIGS. 2A to 2J show the service records stored at each of the devices (C1, C2, C3, C4, H1, H2, S1, S2, F1, P1). Each service record includes a service identifier (leftmost column), a list of tags assigned by users and/or administrators (second column), and a tag-based categorisation of the service (rightmost column). It will be seen that each tag comprises a word or concatenated combination of words. The service identifier is input at the time the device is set-up, the user-assigned tags and category fields are populated during use of the system as described below.

Figure 3A:
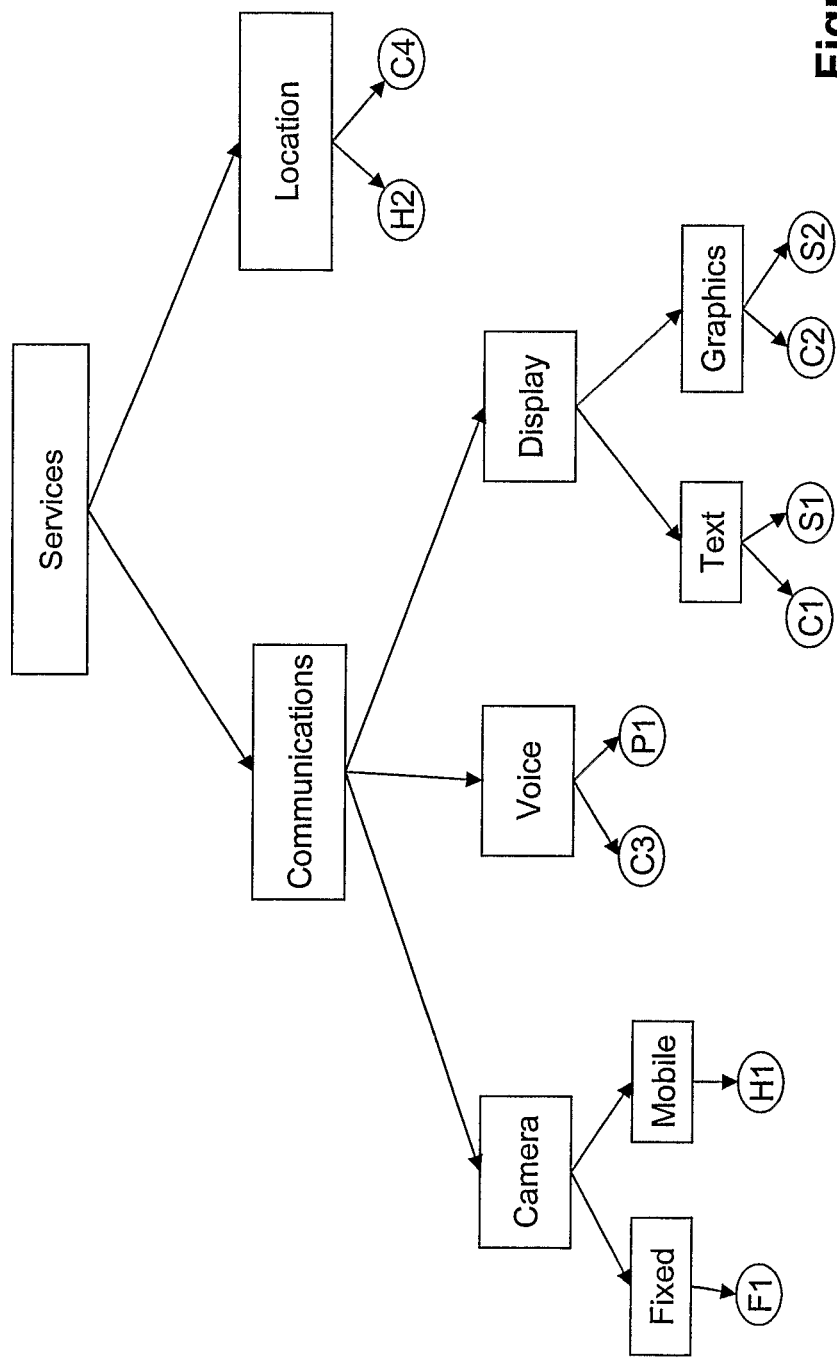
FIG. 3A shows the services offered by the service-based infrastructure organized into a taxonomy.

FIG. 3A shows a service taxonomy which is generated by the administration computer A by a semi-automatic process which will be described in detail below. The service taxonomy is stored in the persistent storage 12 at each client computer (e.g. FIG. 1: U) in the service-based infrastructure. The service taxonomy is stored as a tree, with the leaf nodes of the tree including references to services which have been categorized as belonging to the category represented by the leaf node. Each node of the tree includes a list of tags associated with that the category represented by that node. The service taxonomy is also stored in the administration computer's persistent storage 14. The names of the service categories are chosen by the administrator during the manual phase of the categorization process, as will be described below.

FIGS. 3B-1 to 3B-6 show the list of tags associated with each of the six 'leaf' categories in the service taxonomy. As will be seen from each of FIGS. 3B-1 to 3B-6, each category tag list includes a category identifier (left-hand column), and a list of tags assigned by users and/or administrators to services adjudged to belong to this category following the semi-automatic categorisation described below with reference to FIGS. 8 to 11 (right-hand column). It will be seen that each tag comprises a word or concatenated combination of words. The service identifier is input at the time the device is set-up, the user-assigned tags and category fields are populated during use of the system as described below.

Figure 4:
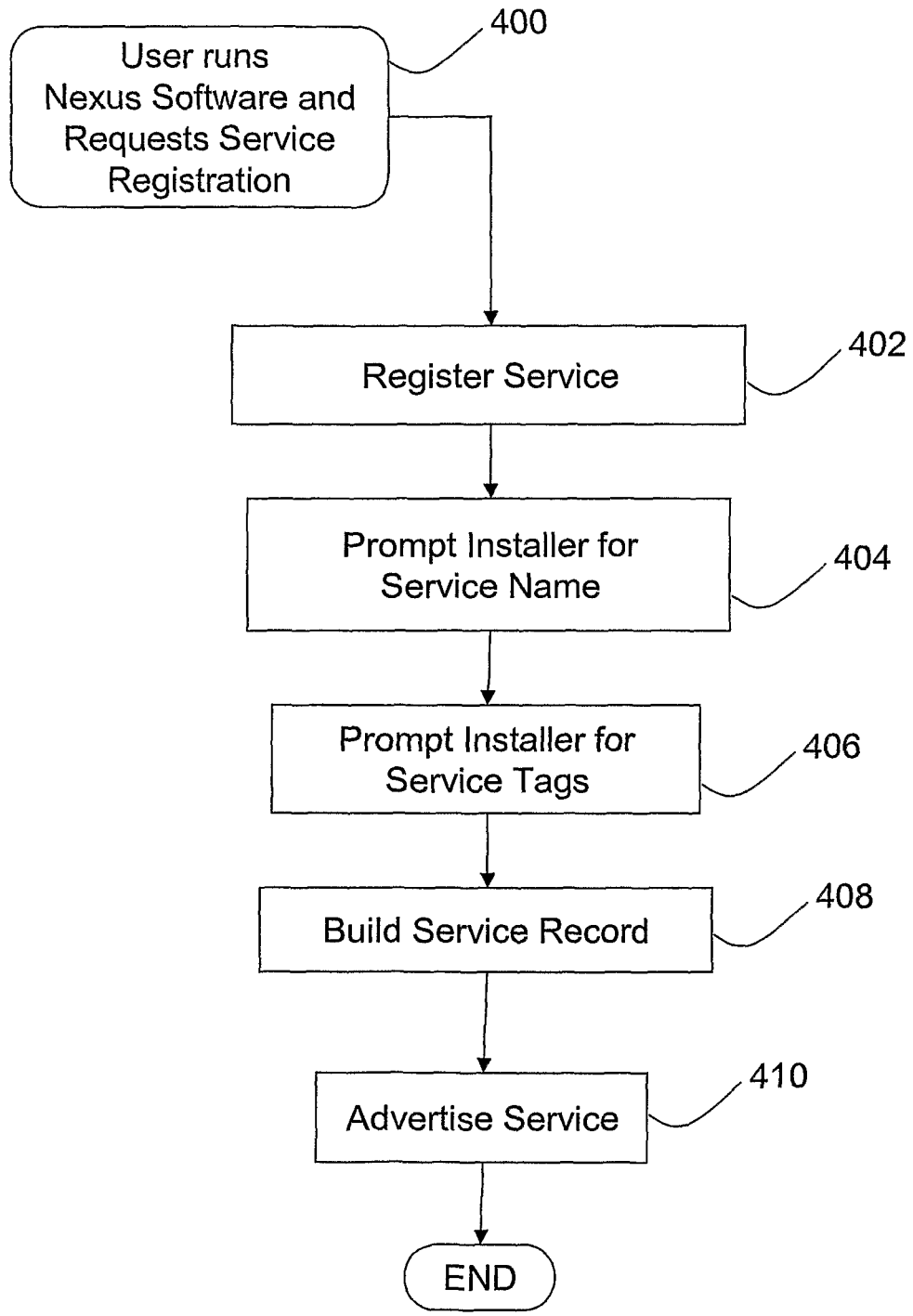

FIG. 4 shows service installation software provided as part of the Nexus middleware. The installation process starts with the user installing and running the Nexus software (step 400) on the electronic device (e.g. H1) and requesting the registration (step 402) of the device's in-built software as a Nexus service. The user is then prompted (step 404) to provide a name for the service. The user is also prompted (step 406) to enter any tags which he considers should be applied to the service. The program then builds (step 408) a service record (FIG. 2A-2J) for the service including the information entered by the installer. Initially, the category field of the service record is set null. The service is then advertised (410) across the Nexus system, allowing it to be invoked by, for example, a user of user computer U when running the Nexus service browser. Those skilled in the art will realise that the service will be described using a service description language such as WSDL. The service description includes interfaces allowing a remote computer to query and update that service record.

Figure 5:
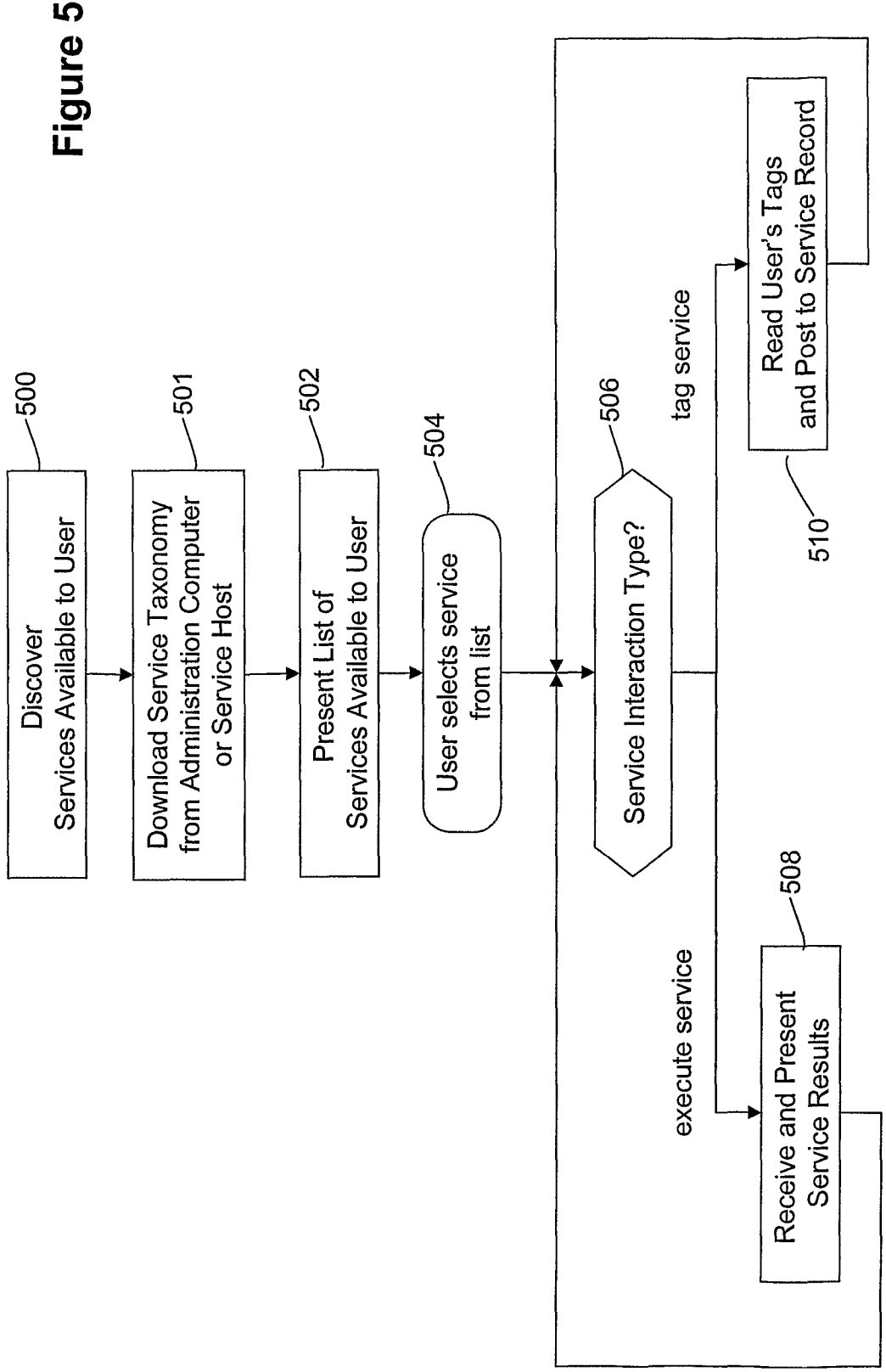

FIG. 5 shows the operation of the user computer U when the Nexus service browser is run on that computer. When the program is started by the user, the Nexus middleware is used to discover (step 500) services which are available via the network 10. The Nexus middleware controls the user computer to download (step 501) the current service taxonomy (FIGS. 3A and 3B) from either an administration computer or a service host. The service browser then presents (step 502) the user with a list of the available services. The available services are then presented as a collapsible/expandible tree that mirrors the service taxonomy (FIG. 3). The user is then prompted to select a service from the list.

Figure 6:
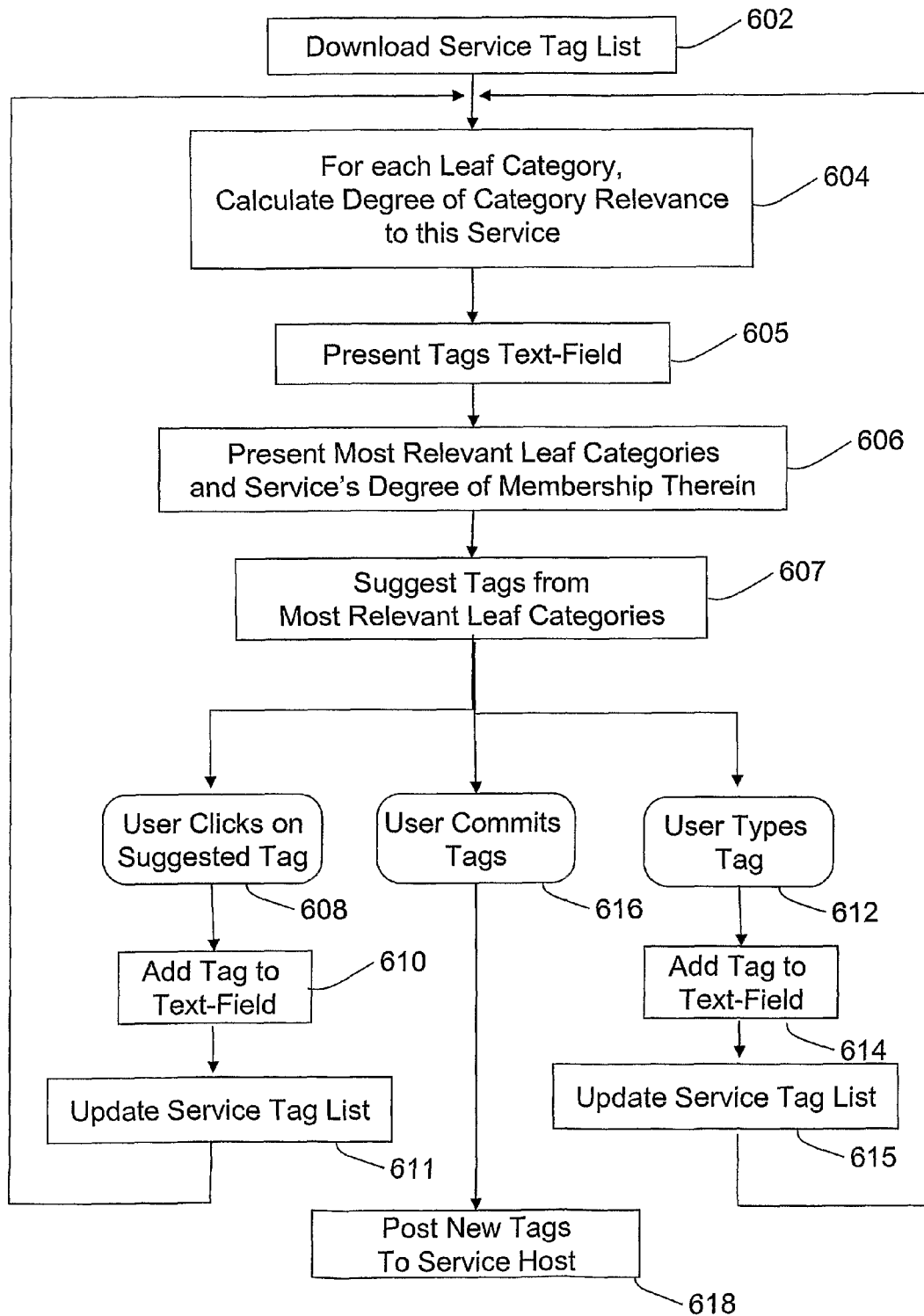

On selecting (step 504) a service the user is then asked (step 506) to select whether he wishes to execute the selected service or tag the selected service. If the user chooses to execute the selected service then the service host executes the service and returns (step 508) the result of the service—which may merely be an assurance that a requested service was carried out—to the user's computer U. If the user chooses to tag the selected service then the processing shown in FIG. 6 is carried out.

The user tagging process (FIG. 6) begins by sending a database query to the electronic device which hosts the service in question (C1, C2, C3, C4, H1, H2, S1, S2, F1, P1). This query returns (step 602) a list of tags already ascribed to the service.

Thereafter, the degree of membership of the selected service in each of the leaf categories in the service taxonomy (downloaded in step 501) is calculated (step 604). This calculation is based on the co-occurrence of tags ascribed by users to this service and the tags in each of the leaf category tag lists included within the service taxonomy.

For each of the leaf categories, the degree of membership of the service in the leaf category is calculated according to the following equation:

$$\text{membership}(S, C) = \frac{\text{number\_of\_tags\_S\_and\_C\_have\_in\_common}}{\sqrt{\text{number\_of\_tags\_in\_S}}\sqrt{\text{number\_of\_tags\_in\_C}}}$$

Those skilled in the art will recognise this as a form of cosine similarity between the set of tags ascribed by users and administrators to the service (downloaded in step 602) and the set of tags found in the category tag list (FIGS. 3B-1 to 3B-6) downloaded as part of the service taxonomy (in step 501).

The user is then presented 605 with an interface including a text-field into which the user can type tags.

Beneath the text field, the names of the two most relevant leaf categories for this service (i.e. the two categories in which this service has the highest degree of membership), along with a percentage value (0-100%) representing the value derived from the above equation for each of those two leaf categories.

The user interface also displays (step 607) the tags found in the category tag lists of the two most relevant leaf categories. In the present embodiment, the usage frequency of those tags is included as part of the service taxonomy, and only, for example, the four most frequently used tags for the most relevant leaf category and the two most frequently used tags of the second most relevant leaf category are displayed to the user. The interface is programmed such that if a user clicks (step 608) on one of the suggested tags then the tag is added (step 610) to the text field.

Words the user types are also added (step 614) to the text field.

Each time the user adds a tag to the text field (either by typing in one or more tags, or by selecting one or more of the suggested tags) the service tag list is updated (step 611 or step 615) to include the added tag. Thereafter, the degree of membership of the service to the categories is re-calculated and the tags suggested to the user updated accordingly (by repeating steps 604 to 607). The text field at each stage includes all the tags which have been entered by the user in this tagging session.

When the user commits the tags by pressing the return or enter key, or pressing a 'Commit' button, the tags in the text field are transmitted (step 618) to the electronic device (C1, C2, C3, C4, H1, H2, S1, S2, F1, P1) hosting the service in question. On receipt of that message, the electronic device (C1, C2, C3, C4, H1, H2, S1, S2, F1, P1) updates its service record by adding the committed tags to its record.

Figure 7:
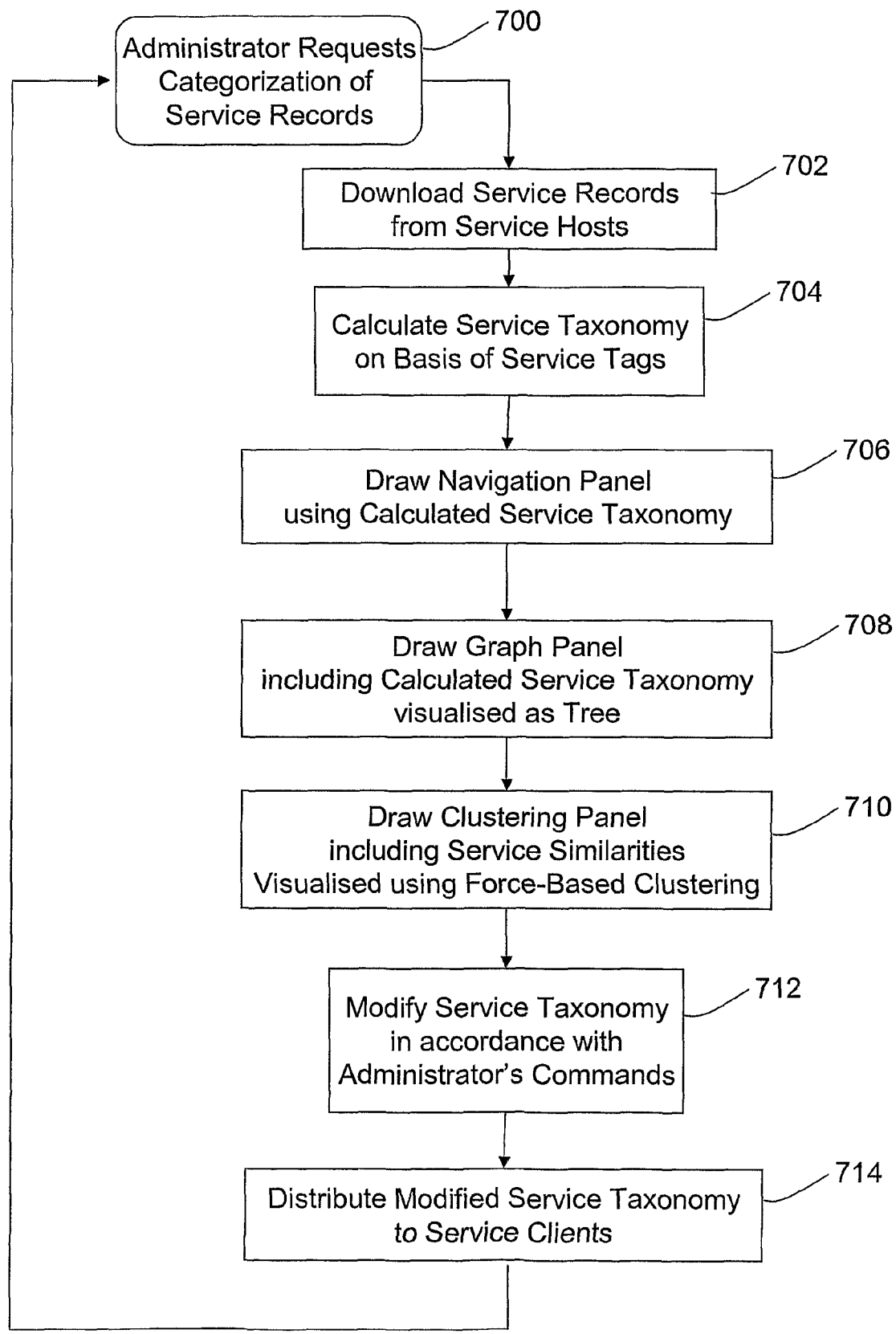
FIG. 7 is a flow-chart illustrating how an administration computer in the service-based infrastructure performs the semi-automatic construction of a service taxonomy for subsequent use in the service-based infrastructure.
Figure 8:
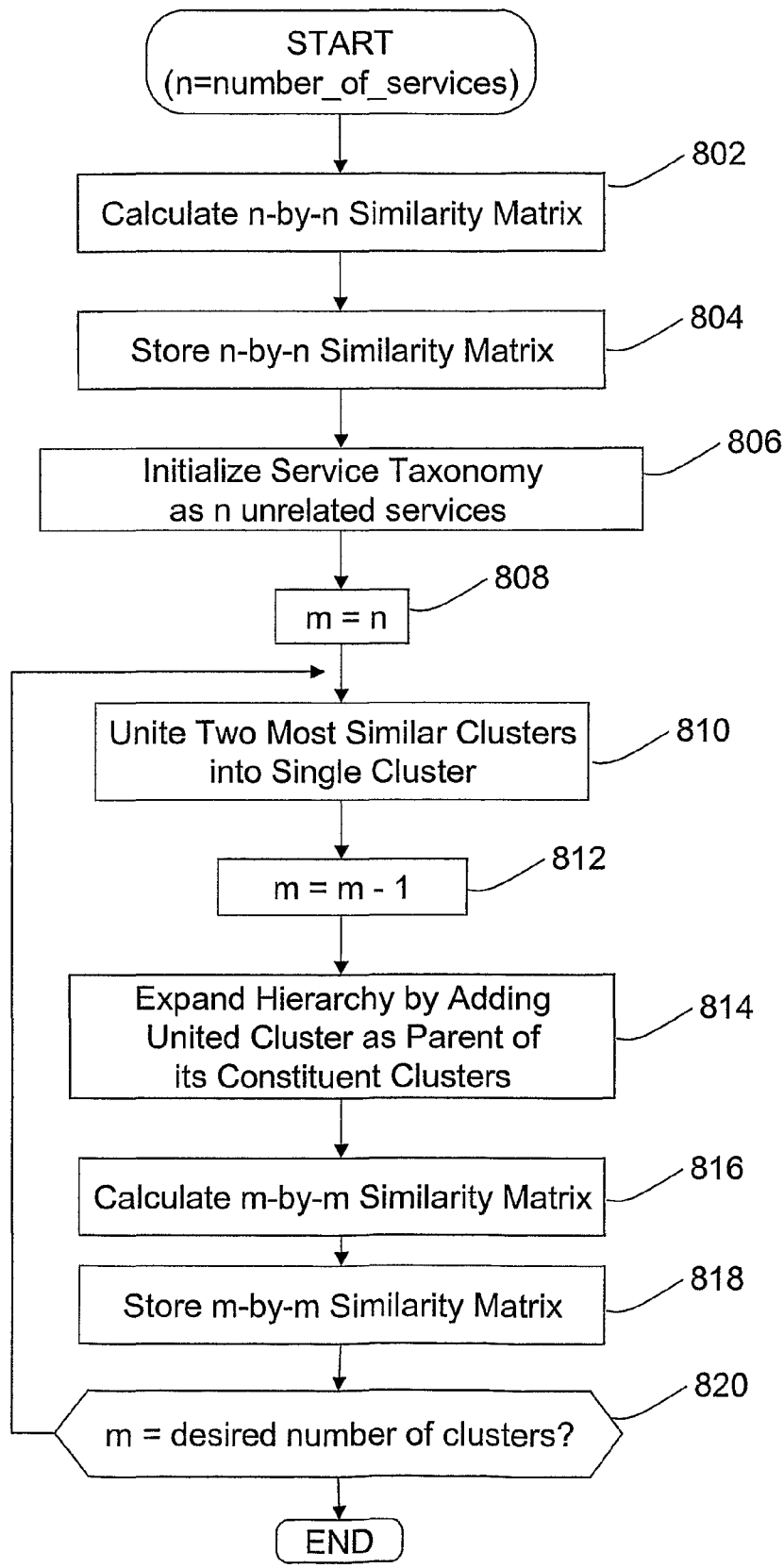
FIG. 8 is a flow-chart showing the automatic phase of the construction of a service taxonomy.
Figure 9:
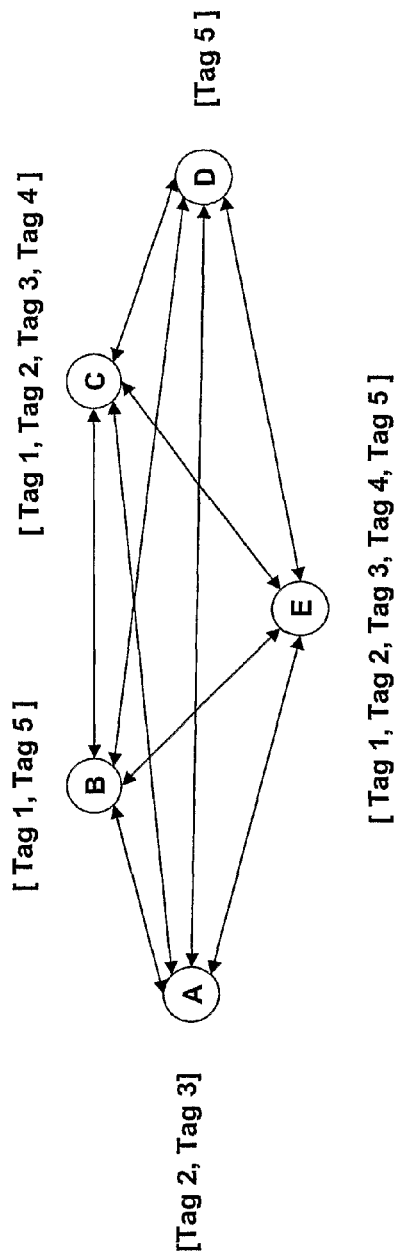
FIGS. 9A and 9B illustrate in more detail the calculations which are used in the automatic taxonomy construction.

FIG. 7 shows the semi-automatic categorization process which is performed by the management application loaded onto the Administrator's computer A. As will more be explained more fully below, the categorisation process is semi-automatic in that the program generates a proposed categorisation automatically and then provides the administrator with an interface (FIGS. 10 and 11) which enables him to modify that categorisation manually.

The semi-automatic categorization process (FIG. 7) is triggered by the administrator requesting (step 700) the categorization of the service records in the system. The categorization process begins with the administration computer A downloading (step 702) the service records (FIGS. 2A-2J) from each of the electronic devices (C1, C2, C3, C4, H1, H2, S1, S2, F1, P1) and concatenating those records in order to form a service table, each row of which corresponds to a service record (FIG. 2A-2J).

The service table is then processed (step 704) to derive a hierarchical categorisation of the different services (the service taxonomy of FIG. 3) on the basis of the tags found in the downloaded service records (FIGS. 2A-2J). This automatic tag-based categorization will now be described in more detail with reference to FIG. 8.

The clustering (FIG. 8) follows a bottom-up approach where each of the n (in this example 10) services is initially regarded as a service cluster containing only that service. The process begins with the calculation of an n-by-n similarity matrix (step 802).

To illustrate the calculation of a n-by-n similarity matrix, an example of 5 services (A-E) and the tags associated with them is seen in FIG. 9A. For each pair of services, a tag-based similarity measure is calculated according to the following equation:

$$\text{similarity}(A, B) = \frac{\text{number\_of\_tags\_A\_and\_B\_have\_in\_common}}{\sqrt{\text{number\_of\_tags\_in\_A}} \sqrt{\text{number\_of\_tags\_in\_B}}}$$

Those skilled in the art will recognise this as a form of cosine similarity between the set of tags in set A and the set of tags in set B. The resulting n-by-n similarity matrix is seen in FIG. 9B. Those skilled in the art will realise that the matrix is symmetric, and hence only the elements above or below the diagonal need be calculated—the values along the diagonal also need not be calculated since they are by definition equal to 1.0.

Once the service similarity matrix has been calculated, it is stored (step 804) for use in subsequent visualisation of service similarity as will be described below.

An abstract data type representing the service taxonomy is then initialised as a set on n services (step 806) without any relationships between them. As will be explained below, the automatic categorisation process will add relationships between the services in order to build up a service taxonomy as seen in FIG. 3. Each node of the service taxonomy includes a list of tags associated with that node.

Thereafter, a cluster count (m) is initialised (step 808) to the number of services (n). This is followed by one or more iterations of a taxonomy building process (steps 810-818).

Each of the iterations of the taxonomy-building process begins with the most similar pair of clusters being identified and combined into a single cluster (step 810). For example, given the 5-by-5 similarity matrix seen in FIG. 9B, the services C and E will be identified as the most similar pair, and combined into a single cluster. The cluster count is reduced accordingly (step 812).

A node representing the combined cluster is then added to the service taxonomy, together with relationship data indicating that the combined cluster is a parent of each of the constituent services (or constituent clusters, or constituent service and cluster) (step 814). The lists of tags associated with each of the constituent services (or constituent clusters, or constituent service and cluster) will be combined to generate a list of tags (the intersection of two sets of tags) which is stored with the node representing the combined cluster.

An m-by-m similarity matrix is then calculated (step 816) by finding similarity measures between the new combined cluster and each of the other clusters/services (the other similarity values can simply be copied from the previous similarity matrix calculation). The similarity measures to the newly combined cluster are calculated using the combined list of tags mentioned above. The m-by-m similarity matrix is then stored (step 818).

A test (step 1006) is then carried out to determine whether sufficient clustering has now taken place. The test might simply be whether a desired number of clusters (say six in this particular example) has been reached. If the test is not met, then another iteration of the taxonomy-building process (steps 810-818) is carried out.

If sufficient clustering has taken place then the automatic phase of the semi-automatic categorization process ends (step 820).

Figure 10:
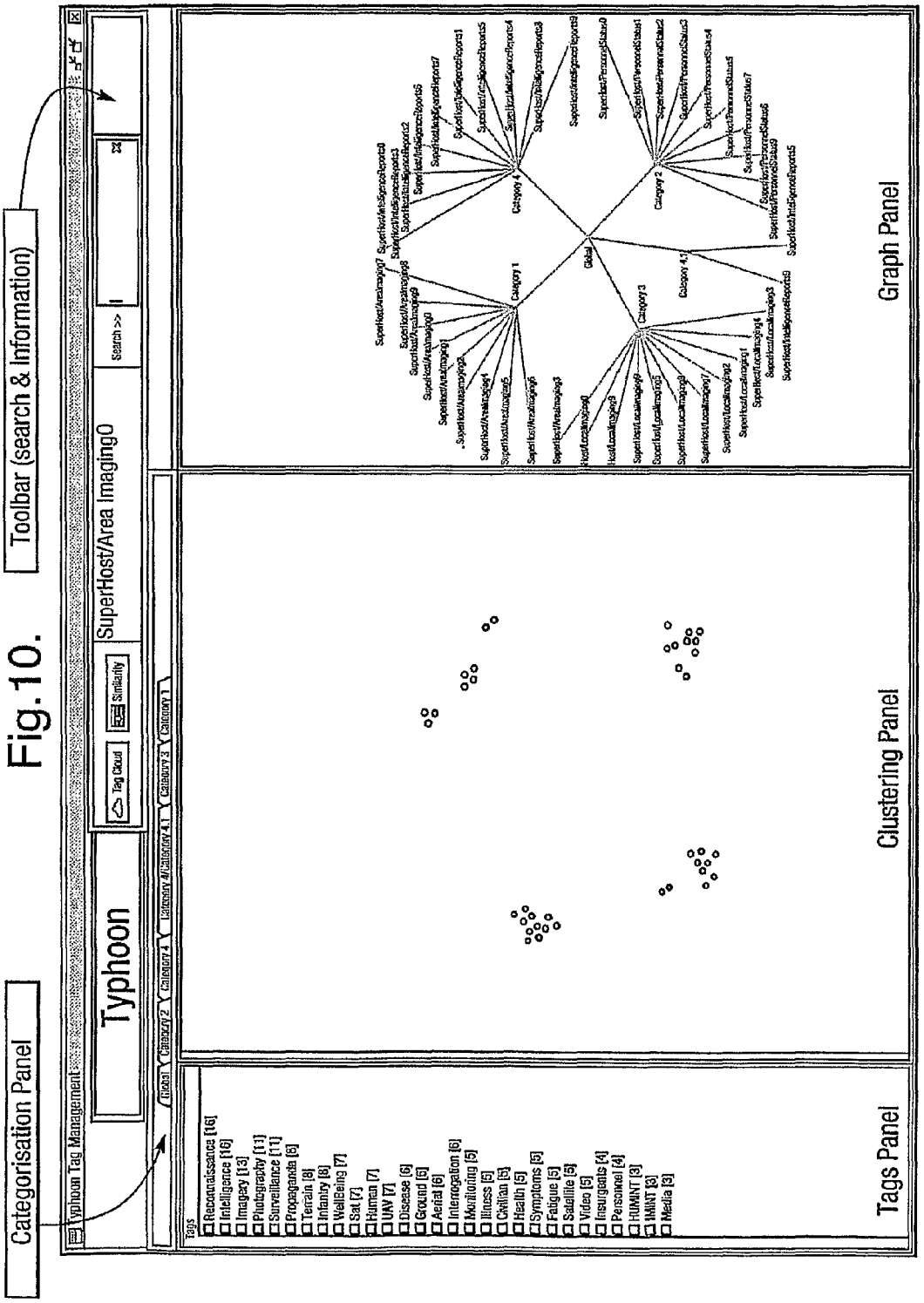
FIG. 10 shows a graphical user interface that presents the automatically-generated taxonomy to an administrator.

FIG. 10 shows the interface presented to the administrator. The graphical user interface is partitioned into five panels as follows:
  Clustering Panel: The services in the system are represented abstractly in this panel as circles and it is here (as will be explained below) that force-based clustering is applied as one means to enable the administrator to visualise relationships between them.
  Navigation Panel: A set of tabs in this panel allow the user to alter the view of the system in the clustering panel by selecting subsets. Any existing structure in the form of categories of services (e.g. the taxonomy illustrated in FIG. 3) is reflected here with one tab per category.
  Tag Panel: The top tags in the entire system of services are displayed in a ranked list. These may be selected and the view on the clustering panel will be updated accordingly.
  Graph Panel: Any existing structure in the system of services is displayed in this panel as a graph. The structure might, for example, be a tree representation of the taxonomy illustrated in FIG. 3.
  Toolbar: Details about the currently selected services are displayed in this panel as well as a search box offering the user to filter the view of the system by means of keywords. Additional pop-up panels are also accessible from here such as a tag cloud view.

Returning to FIG. 7, the semi-automatic categorization process continues by drawing different components of the management application's graphical user interface.

To provide the various visualisations seen in the graphical user interface a package called Prefuse (www.prefuse.org) is used.

The navigation panel is drawn using the service taxonomy calculated in the automatic categorization routine. A tab is presented for the currently selected category of the service taxonomy (FIG. 3). Initially, the category is set to the global 'services' category. In addition, tabs representing the immediate sub-categories are displayed. When the currently selected tab is not that representing the highest-level category, a further tab is provided which allows the administrator to move up one hierarchical level in the service taxonomy.

The graph panel is also drawn using the service taxonomy calculated in the automatic categorization routine. The service taxonomy is presented there in tree form.

The clustering panel is drawn (step 708) using a force-based clustering visualisation tool offered as part of the Prefuse package. The tool presents services as circles in the clustering panel and then moves them as if there were an attractive spring force between the circles which is in proportion to the cosine similarity between the services taken from the n-by-n similarity matrix calculated in step 804. This can assist the user in seeing how he might modify the membership of the different categories in order to improve upon the automatic categorisation.

In a preferred embodiment, the membership of the automatically generated categories is shown by distinctively highlighting the services belonging to different categories. An example of this can be seen in FIG. 11 where six automatically generated categories (1102-1112) are shown.

Returning to FIG. 7, the management application's graphical user interface allows the administrator to view the service taxonomy in the following ways.

Selection of Tab in Navigation Panel

By selecting a tab other than the one which represents the highest-level category, then only those services within the selected category are shown in the clustering panel.

Selection of Tag(s) in Tag Panel

On the administrator selecting one or more tags from the ranked list of tags in the tag panel the services having the selected tags are highlighted in the clustering panel.

Figure 11:
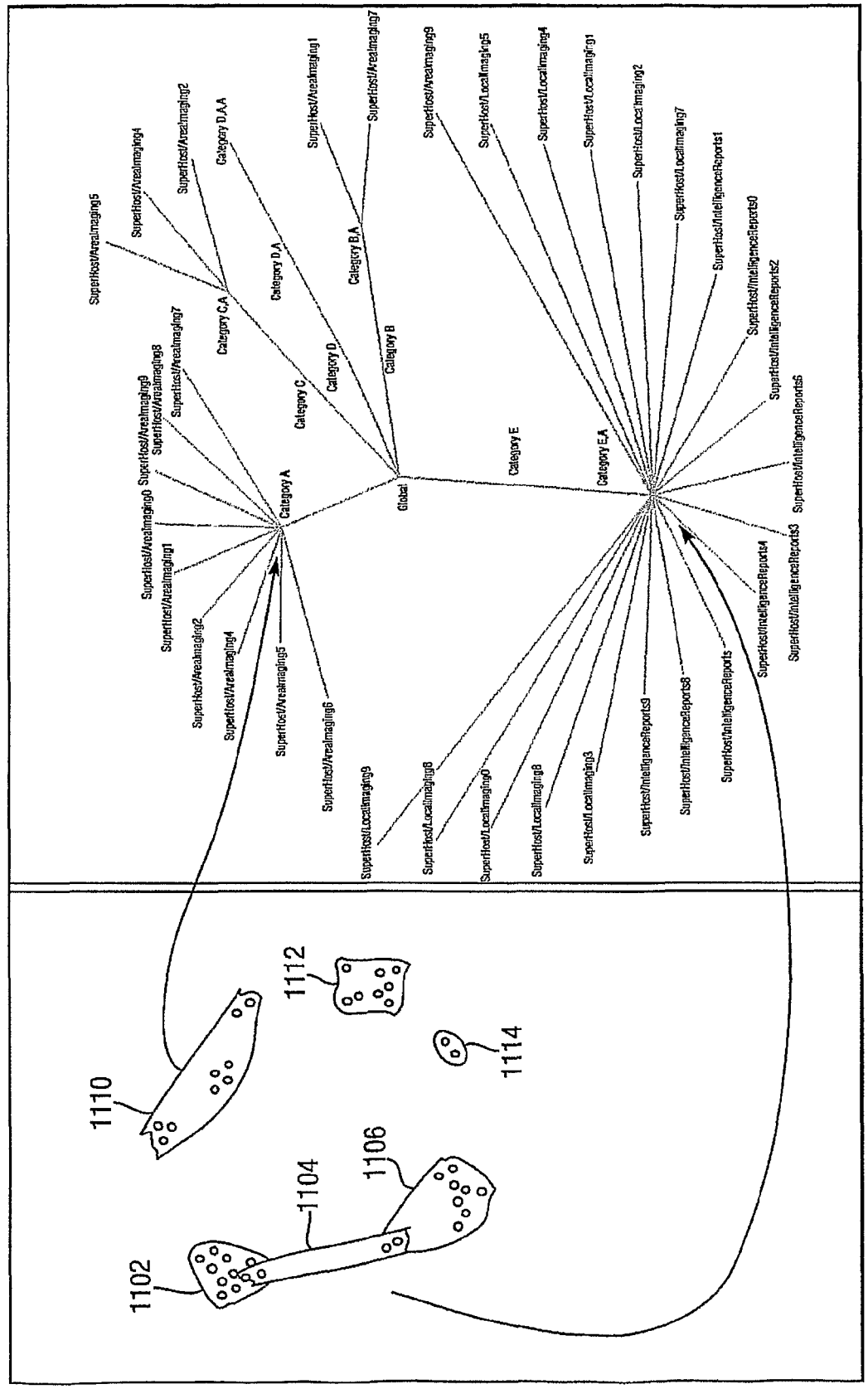
FIG. 11 shows how the administrator can use the graphical user interface to modify the automatically-generated taxonomy.

The management program then modifies (step 710) the service taxonomy (FIG. 3) in accordance with commands entered by the administrator using the graphical user interface (FIGS. 10 and 11).

Selection of Services in Clustering Panel

By selecting a group of entities in the clustering panel and issuing a 'Group' command, then the selected entities are formed into a group. The user is prompted to give a name to group. The service taxonomy is then updated to by adding a sub-category to whatever category is currently selected using the Navigation Panel. It will be realised that this enables the user to both merge and split categories.

Drag-and-Drop of Service Groups to Graph Panel

By selecting a group of services in the clustering panel, and then 'dragging-and-dropping' the selected group to a node on the tree drawn in the graph panel, the selected group is made a sub-category of whatever category is represented by the node on which the group is 'dropped'.

When the administrator considers that his modifications to the service taxonomy provide a beneficial categorisation of the services, he requests the administration computer to distribute (step 712) the modified service taxonomy to client computers (e.g. user computer U) in the network. The client computers then store the modified service taxonomy in persistent storage (12).

Thereafter, on finding that a remote service required by a user is not available, applications running on those client computers can the use the categorisation to propose other services in the same category as substitutes or even automatically substitute services in the same category.

It will be seen how the above embodiment generates a taxonomy which reflects the way in which users of the system are currently tagging the different services offered within the system. Furthermore, it will be seen how that taxonomy is used in suggesting tags to a user which align with the way in which other users have tagged services in the most relevant categories within the taxonomy. Where the tags entered by the user are ambiguous in that they are not much more closely associated with one category than the others, then by choosing one or more suggested tags, the user will be able to resolve the ambiguity.

Thus, use of the embodiment should provide for a coherent set of tags being present in the system which will in turn result in the more rapid and accurate selection of a service suitable for a user's needs.

Possible modifications to the above embodiment include:
i) rather than services being tagged, documents, especially web-pages could be tagged. In that case, the benefit of expedited retrieval of documents relevant to a user's query would be realised.
ii) instead of the service records being distributed at service hosts, a centralised database could be used storing a plurality of records—each including, for example, URLs, tags ascribed to the URLs, and user IDs for each tag submitted
iii) the service records could further include tag frequency for each tag, in that case, a more sophisticated cosine similarity based on tf-idf (term frequency—inverse document frequency) could still be calculated.
iv) a Euclidean similarity measure or other well-known document similarity measure could be used instead of a cosine similarity measure
v) the administration facility could be built into the service browser
vi) a service taxonomy could be imported to the management application and displayed in the graph panel. The user could then modify the existing taxonomy on the basis of the results of force-based clustering in the clustering panel
vii) the above example focussed on the application of the invention to web services or other distributed application components. The present invention is also of great utility in the organisation of forum posts where many users submit their views on varied topics to a central server which stores all the forum posts together
viii) Also, it should be noted, that from a middleware point of view there are uses of the taxonomy other than just presentation/filtering for the user. Although not explained in the Nexus reference mentioned above, the latest version of Nexus uses Topics to transmit messages across its Publish/Subscribe messaging infrastructure. One of the main benefits for having an administration system such as that described above is to reflect semantic taxonomic knowledge about the services down to the level that they are being advertised across the network. This way a user can (or the system on behalf of the user) can choose to only subscribe to the relevant subset of information (about Service Record changed etc.) and as such a bandwidth reduction may be achieved (especially important in a large-scale distributed system with low bandwidth). This provides content-based routing, not by the routing mechanism directly examining the content (e.g. deep-packet inspection), but instead indirectly from a variation of the above embodiment which analyses the metadata and involves the user in the process (taking the actual content into account) to derive the best possible set of categories, i.e. Topics to which the messaging infrastructure itself is structured
viii) in embodiments where documents, rather than services, are being tagged, and the document in question has not previously been tagged, keywords derived automatically from the content of the document could be used in place of tags previously entered by other users.
ix) in the above embodiment, the suggested tags were chosen on the basis of the tag's popularity in describing resources belonging to the candidate category. In preferred embodiments, the suggested tags are also chosen to select those tags which are often found to occur together with the tags so far selected by the user. To achieve this the user's computer must additionally download tag co-occurrence values, and the administration data must periodically re-calculate those values.
x) in the above embodiment, the suggested tags belonging to the most likely category for the resource were emphasized by simply presenting more tags from that candidate category. In other embodiments, the tags from the most likely category might be emphasized by presented the suggested tags in the form of a tag cloud and presenting those tags belonging to the most likely category in a larger font size.

In summary of the above, a distributed system is described in which resource utilisation decisions depend upon the categorisation of resource descriptions stored in the distributed system. In the principal embodiment, the resource descriptions are web service descriptions which are augmented with tags (i.e. descriptive words or phrases) entered by users and/or by web service administrators. A service taxonomy is constructed on the basis of the tags, and is subsequently used in suggesting tags to the user which the user might want to ascribe to the service in question. This leads to a more coherent and focussed set of tags in the system, which in turns results in better resource utilisation decisions and hence a more efficient use of the resources of the distributed system.

What is claimed is:

1. A method of electronic resource annotation comprising:
receiving, for each of a plurality of categories of a resource, a category tag list of tags often applied to resources in that category;
receiving, from a user who has reviewed the resource, one or more tags the user attributes to that resource;
calculating on the basis of said one or more tags received from said user and said category tag lists, a degree of membership of the resource to each of said plurality of categories;
selecting two or more candidate categories to which the resource has the highest degree of membership; and
proposing, using a computer system including at least one computer processor, further tags in the category tag lists of said selected candidate categories to said user, the proposed further tags including tags from a first of the two or more selected candidate categories and at least one tag from a second of the two or more selected candidate categories, the resource having a higher degree of membership with respect to the first selected candidate category than to the second selected candidate category, and the proposed further tags including a number of tags from the first selected candidate category which is higher than a number of the at least one tag from the second selected candidate category.

2. A method according to claim 1 further comprising the step of recognizing user selection of one or more of the proposed further tags, and repeating said calculation, selection and proposal steps.

3. A method according to claim 1 wherein said category tag lists form a labeled taxonomy.

4. A method according to claim 1 further comprising the step of generating said category tag list from tags applied to resources by users.

5. A method according to claim 1 wherein proposing further tags involves emphasizing tags associated with said selected candidate categories.

6. A method according to claim 5 wherein said emphasis is achieved by presenting the user with more tags associated with said selected candidate categories than tags associated with other categories.

7. A method according to claim 1 wherein the tags from the first selected candidate category in the proposed further tags are the most frequently used tags in the first selected candidate category and the at least one tag from the second selected candidate category in the further tags is the most frequently used tag in the second selected candidate category.

8. A distributed system comprising one or more user terminals, an electronic resource store, a resource label store for storing, for each of said electronic resources, labels applied by users to said electronic resource, and communications links between said user terminal and said electronic resource data store and between said user terminal and said resource labelling store;
said distributed system further comprising a resource categorization store which stores, for each resource, an indication of the degree of membership of said resource to a plurality of categories;
wherein each of said user terminals is arranged in operation to:
enable said user to select an electronic resource;
in response to said selection, to display said selected electronic resource on a display of the user terminal;
to receive via a user interface provided by the user terminal, textual labels which the user considers appropriate to said selected electronic resource; and
to send said textual labels together with an indication of said resource to said resource label store to enable said store to be updated;
said distributed system being arranged in operation to respond to a user selection of an electronic resource by finding on the basis of said one or more textual labels received from said user and the information stored in said resource categorization store, two or more candidate categories to which the resource is most likely to belong, to select labels appropriate to said candidate categories and to send said labels to said user terminal;
said user terminal being further arranged in operation to present said user with said labels as proposals for labels to be applied to the selected resource, the proposals for labels including labels from a first of the two candidate categories to which the resource is most likely to belong and at least one label from a second of the two or more selected candidate categories to which the resource is most likely to belong, the resource having a higher degree of membership with respect to the first candidate category than to the second candidate category and the proposals for labels including higher number of labels from the first candidate category than from the second candidate category.

9. A method of electronic resource annotation comprising:
receiving, for each of a plurality of categories of resource, a category tag list of tags often applied to resources in that category;
receiving, from a user who has reviewed the resource, one or more tags the user attributes to that resource;
selecting on the basis of said one or more tags received from said user and said category tag lists, candidate categories to which said resource belongs; and
proposing, using a computer system including at least one computer processor, further tags in the category tag lists of said candidate categories to said user, the proposed further tags including tags from a first of the selected candidate categories and at least one to from a second of the selected candidate categories, the first selected candidate category having a higher degree of relevance with respect to the resource than the second selected candidate category, and the proposed further tags including a higher number of tags from the first selected candidate category than from the second selected candidate category.

10. A distributed system comprising one or more user terminals, an electronic resource store, a resource label store for storing, for each of said electronic resources, labels applied by users to said electronic resource, and communications links between said user terminal and said electronic resource data store and between said user terminal and said resource labelling store; said distributed system further comprising a resource categorization store which stores, for each resource, an indication of a category to which said resource is deemed to belong;
wherein each of said user terminals is arranged in operation to:
enable said user to select an electronic resource;
in response to said selection, to display said selected electronic resource on a display of the user terminal;
to receive via a user interface provided by the user terminal, textual labels which the user considers appropriate to said selected electronic resource; and
to send said textual labels together with an indication of said resource to said resource label store to enable said store to be updated;
said distributed system being arranged in operation to respond to a user selection of an electronic resource by identifying candidate categories for said resource using the information stored in said resource categorization store, and to select labels appropriate to said candidate categories and to send said labels to said user terminal;
said user terminal being further arranged in operation to present said user with said labels as proposals for labels to be applied to the selected resource, the proposals for labels including labels from a first of the candidate categories for the resource and at least one tag from a second of the selected candidate categories for the resource, the first candidate category having a higher degree of relevance with respect to the resource than the second candidate category, and the proposals for labels including a higher number of labels from the first candidate category than from the second candidate category.

11. A non-transitory computer readable medium storing computer readable instructions which, upon execution by a computer system, provide operation relating to electronic resource annotation comprising:
receiving, for each of a plurality of categories of a resource, a category tag list of tags often applied to resources in that category;
receiving, from a user terminal, one or more tags the user attributes to that resource;
calculating on the basis of said one or more tags received from said user terminal and said category tag lists, a degree of membership of the resource to each of said plurality of categories;

selecting two or more candidate categories to which the resource has the highest degree of membership; and proposing further tags in the category tag lists of said selected candidate categories to said user terminal, the proposed further tags including tags from a first of the two or more selected candidate categories and at least one tag from a second of the two or more selected candidate categories, the resource having a higher degree of membership with respect to the first selected candidate category than to the second selected candidate category, and the proposed further tags including a number of tags from the first selected candidate category which is higher than a number of the at least one tag from the second selected candidate category.

12. The method according to claim 11 wherein the tags from the first selected candidate category in the proposed further tags are the most frequently used tags in the first selected candidate category and the at least one tag from the second selected candidate category in the proposed further tags is the most frequently used tag in the second selected candidate category.

13. A non-transitory computer readable medium storing computer readable instructions which, upon execution by a computer system, provide operation relating to electronic resource annotation comprising:

receiving, for each of a plurality of categories of resource, a category tag list of tags often applied to resources in that category;

receiving, from a user terminal who has reviewed the resource, one or more tags the user attributes to that resource;

selecting on the basis of said one or more tags received from said user terminal and said category tag lists, candidate categories to which said resource belongs; and proposing further tags in the category tag lists of said candidate categories to said user terminal, the proposed further tags including tags from a first of the selected candidate categories and at least one tag from a second of the selected candidate categories, the first selected candidate category having a higher degree of relevance with respect to the resource than the second selected candidate category, and the proposed further tags including a higher number of tags from the first selected candidate category than from the second selected candidate category.

14. The method according to claim 13 wherein the tags from the first selected candidate category in the proposed further tags are the most frequently used tags in the first selected candidate category and the at least one tag from the second selected candidate category in the proposed further tags is the most frequently used tag in the second selected candidate category.

* * * * *